Nov. 24, 1970   S. ALBARDA   3,543,167
DIFFERENTIAL FREQUENCY MEASURING DEVICE
Filed Aug. 15, 1967   3 Sheets-Sheet 1

INVENTOR.
SCATO ALBARDA

BY

AGENT

United States Patent Office 3,543,167
Patented Nov. 24, 1970

3,543,167
DIFFERENTIAL FREQUENCY MEASURING DEVICE
Scato Albarda, Emmasingel, Eindhoven, Netherlands, assignor, by mesne assignments, to U.S. Philips Corporation, New York, N.Y., a corporation of Delaware
Filed Aug. 15, 1967, Ser. No. 660,648
Claims priority, application Netherlands, Aug. 19, 1966, 6611688
Int. Cl. H03f 3/04
U.S. Cl. 328—133                4 Claims

ABSTRACT OF THE DISCLOSURE

A differential frequency measuring device which uses a phase quadrature generating device and a pair of exclusive OR-gates for converting a fixed frequency series of square wave pulses and a variable frequency series of square wave pulses into a pair of square wave pulse signals having a frequency equal to the difference in frequency between the fixed and variable frequency signals and having a phase difference corresponding to the sign of the frequency difference between the fixed and variable frequency pulses.

---

The invention relates to a device for digital displacement measurements for machine tools, comprising a pick-up device, which is arranged on or near a machine component the displacements of which is to be measured and which delivers two pulse series, of which the frequency difference in value and the sign (positive or negative) is to be measured. Of these two pulse series, one of the pulse series may form a reference signal (RS) while the other pulse series comprises the measuring information (MS). The frequency difference between the two pulse series then is a measure of the displacement while the sign of the said frequency difference indicates the direction of the displacement. This is the so-called RS, MS measuring system.

In a known device of this type —as described in my U.S. Pat. No. 3,371,215 issued Feb. 7, 1968—an opposite grating having a high apparent speed $V_s$ is conducted, by auxiliary means in the pick-up device, along a grating secured to the machine component and also along a fixed grating element incorporated in the pick-up device. In this case, the said MS, RS pulse series are obtained by means of light, which series are converted into electrical RS, MS signals by means of photoelectric cells.

These signals have the following shape:

$$MS = A + a \sin \frac{2\pi}{p}(V_s \cdot t + x)$$

$$RS = B + b \sin \frac{2\pi}{p} V_s \cdot t$$

wherein A, B, $a$ and $b$ are constants and $V_s$ is the apparent speed, $p$ the grating period, $x$ the actual displacement.

In order to be able to carry out accurate measurements, (so-called large resolving power) it is not necessary to use a fine grating division since electronic interpolation may be used up to, for example, 1000×.

With optical means an extensive fine grating division can be obtained, but in pick-up devices of the inductive or capacitive type such a fine division presents great difficulties. As a result of the possibility of an extensive electronic interpolation the use of the said RS, MS principle does not only present an important possibility for optical pick-up devices to increase the resolving power, but just as a result also enables the use of capacitive or inductive RS, MS pick-up devices.

A device for determining the value and the sign of the frequency difference between two pulse series, as is used in the above RS, MS measuring system, and in which also an interpolation of the measured value takes place is known per se. In these devices, the MS, RS signals obtained with inductive pick-up devices are synchronized, after amplification and conversion into block signals MB, RB, with a clock pulse CL which has a frequency which is a factor $n$ times, equal to the desired interpolation factor, higher than any of the signals MB or RB. The synchronized signals MBS and RBS control a counting device in which the leading edge of RBS starts the counter and the leading edge of MBS stops the counter. During the counting period between starting and stopping, the clock pulses are applied to a counter input and counted in the counter. The position of the counter with the desired $n$ fold interpolation is a measure of the distance $x$. Through a register this counting position is set in a main counting device which indicates the position of the measuring system. Because the signal periods of RS, MS succeed one another rapidly and in order to handle the information in the correct manner, special circuit arrangements must be present for carrying out all the handling operations of the signals without errors. As a result of this the handling of the measured information becomes expensive and complicated.

Another device is known in which in a simple manner by means of logic circuit elements, the frequencies of two pulse series are compared with one another. For this purpose this device comprises a bistable multivibrator and two AND-gates, each of the pulse series being presented to an input of the multivibrator and to an input of one of the AND-gates. The outputs of the multivibrator are likewise connected each to an input of one of the gates. At the output of one of the gates a pulse which can be counted, for example, positive in a counting device to be connected, appears only if between two successive pulses of the first pulse series more than one pulse of the second pulse series occurs. At the output of the other AND-gate a pulse which can likewise be counted in the counting device but then in the opposite counting direction, thus negatively, appears if between two successive pulses of the second pulse series more than one pulse of the first pulse series occurs. In this manner both the value and the sign (positive or negative) of the frequency difference between the two pulse series is established.

This device has the following drawbacks:

(1) Every time the phase difference between MS and RS passes the zero value, practically two counting pulses maximally can be produced. It will be demonstrated hereinafter that according to the invention this number may be 4. So, for the same resolving power an additional doubling stage is necessary when using this known device. This is no objection when the phase noise in RS and MS is small. In practice, however, it is found difficult for more extensive interpolation to exceed totally 8 to 10x with frequency multiplication, because in the presence of frequency noise either the stability or the phase lock of the original signal and the multiplied signal are lost.

So totally this gives a restriction for the extent to which interpolation is possible.

(2) No arbitrary block pulses or pulse edges can be presented to the known device. Counting errors would occur which are not permissible in a measurement. Before the two pulses series are applied to the known devices, they must be converted to pulse series synchronized with an external clock pulse, a pulse being formed per leading and/or trailing edge of the signals $$\frac{n}{2} \cdot MB \text{ and } \frac{n}{2} \cdot RB$$

(formed after multiplication by a factor $n/2$ at a desired interpolation factor $n$). Of course there must be more than 2, actually at least 3, clock pulses per period of $$\frac{n}{2} \cdot MB \text{ and } \frac{n}{2} \cdot RB$$

respectively, since otherwise synchronisation is impossible. So in this case the highest system frequency is in the order of $$3\frac{n}{2} \cdot RB$$

while it will be proved that in the embodiment according to the invention the highest system frequency is $$\frac{n}{4} \cdot RB$$

The external clock pulse generator and synchronization means make the known device complicated while it depends upon the use whether the frequency which is $$\frac{\frac{3}{2}}{\frac{1}{4}} = 6x \text{ higher}$$

presents difficulties in the system. Since it is of practical advantage to choose the apparent speed $V_s$ of the opposite grating and the base frequency of the RS and MS-signals to be high, this will indeed often be the case.

(3) The known device provides no protection against the frequency noise. In the presence of frequency noise, erroneous plus and minus pulses appear at the output so that the known device must be used several times in succession before the noise is suppressed. If this is done, and if then there is indeed less or no noise, the first pulses, in the case of variations of the direction of the machine component, will first be retained after the reversal of the movement so that a hysteresis dependent upon the noise is formed which is inadmissible for a measuring system.

It is the object of the invention to provide improvements with respect to the known methods, namely: (a) a drastic reduction of the bulkiness of the apparatus; (b) a considerable improvement of the sensitivity to interference; (c) a system frequency which is at least $4x$ lower as compared with the highest frequency which would be necessary for the same resolving power in a known device.

The invention is characterized in that the first and the second pulse series and the respective inverses thereof are applied to a first exclusive OR-gate and in which the first pulse series and its inverse and the second pulse series and its inverse through an approximately 90° phase delaying network, respectively, are applied to a second exclusive OR-gate, and in which furthermore the outputs of the first and second exclusive OR-gates, respectively, are connected to a low-pass filter succeeded by a pulse shaping network, and the phase-shifted pulse series thus formed, which have a frequency equal to the frequency difference to be determined, are applied to a known discriminator device for determining the sign of the frequency difference comprising a counting device which is controlled by the sign of the frequency difference.

The known discriminator device is the discriminator which is used in another system for measuring displacement, the so-called $S_0$, $S_{90}$ measuring system. It will be described below why this $S_0$, $S_{90}$ measuring system as such is less suitable. An $S_0$, $S_{90}$ measuring system comprises a grating having transparent and opaque stripes secured to a machine component and two short pieces of the same type of grating secured to the machine component, the displacement of which is to be measured relative to the first machine component. Behind the short pieces of grating photoelectric cells are arranged and on the other side of the asembly a light source is arranged. When the short pieces of grating (opposite grating) are moved along the grating, the photoelectric cells are exposed to light in a fluctuating manner and produce an electric signal which is proportional thereto. Because one short piece of grating of the opposite grating is shifted $(n+\frac{1}{4})$ grating pitches relative to the other, the electrical signals are shifted electrically 90° relative to one another. In such signals counting pulses can be derived by means of a known device, namely 4 counting pulses per grating pitch displacement at an output (the plus output) when the machine component is displaced in a given direction, or 4 counting pulses per grating pitch displacement at another output (the minus output), in the case of displacement in the opposite direction.

It has been found that $S_0$, $S_{90}$ measuring systems have a few substantially insoluble drawbacks. The frequency of $S_0$ and $S_{90}$ is proportional to the rate of displacement. So in the frequently occurring stationary position of the machine component concerned the frequency is zero. So the electronic amplification must be effected with direct voltage amplifiers. A more serious drawback is that known photoelectric cells have a dark current which is dependent upon the temperature and stray light, so that in practice it is substantially impossible to choose such a construction that also after having been used for some time, there can be discriminated with certainty between a "low" signal which has turned out high and a "high" signal which has turned out low. Of course, a good operation is out of the question in these circumstances. In addition, it has proved very difficult in practice to produce more than 4 counting pulses per pitch from $S_0$, $S_{90}$ signals.

Finally, gratings can be made only in restricted lengths so that in the case of somewhat larger measuring lengths junctions are necessary. As a result of inter alia temperature differences between grating and base, the ends of two joining grating sections start moving relative to one another. In the case of a fine grating it may easily occur that this movement becomes ½ pitch, the $S_0$, $S_{90}$ signal disappearing when passing the junction. These difficulties made it necessary for accurate measurements to use the RS, MS-measuring systems described here.

Since, however, the shape in which the information in the device according to the invention after handling in the said first exclusive OR-gate and the second exclusive OR-gate preceded by the phase-delaying network, respectively, the respective filter arrangements and the pulse shaping networks appears at the output thereof, corresponds to the said phase-shifted signal pulse series of the $S_0$, $S_{90}$ displacement measuring system, the same known discriminator device may advantageously be used. This may also be of importance in connection with exchange possibilities.

The invention will be described in greater detail, with reference to the drawing.

Figure 1A:
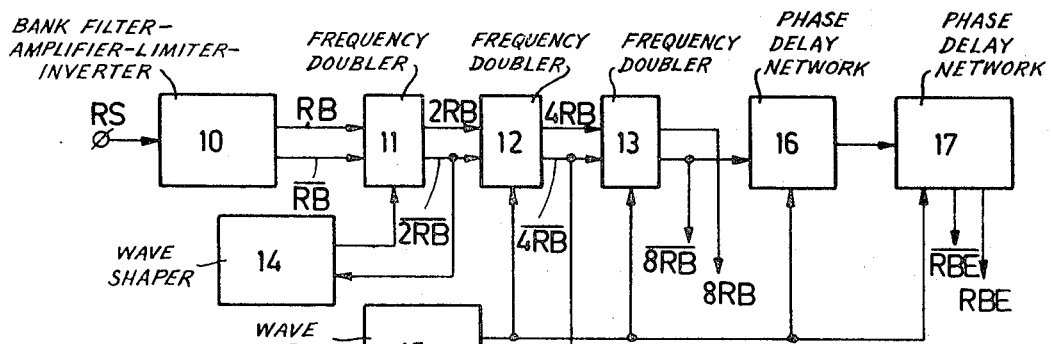
FIG. 1 shows the measuring system with the device according to the invention.
Figure 1B:
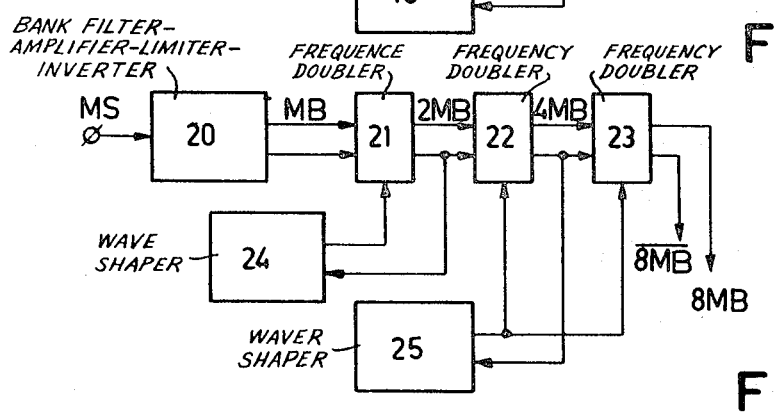

FIGS. 1$a$ and 1$b$, respectively, show devices for handling the pulse series RS and MS, respectively, to signals 8RB with $\overline{8RB}$ (this is the inverse form of 8RB) and RBE with $\overline{RBE}$ and to signals 8MB with $\overline{8MB}$, respectively, FIG. 1$c$ shows the device for the further handling of these signals to the signals $S_0$, $\overline{S_0}$ and $S_{90}$, $\overline{S_{90}}$. In these figures, reference numerals 10 and 20 denote a band filter-amplifier-limiter and inverter device in which the signals RS and MS, respectively, appear at the output in the form of filtered amplified and limited block signals RB and $\overline{RB}$ and MB and $\overline{MB}$, respectively. Reference numerals 11, 12, 13 and 21, 22, 23, respectively, denote multiplication stages, reference numerals 14 and 15 and 24, 25, respectively, denoting control devices which safeguard and recontrol the symmetry of formed pulses (such control see for example German Pat. 1,006,020). Reference numerals 16 and 17 denote a phase delaying network. The signals RS and MS are substantially not noise-free; they have amplitude and frequency noise with all kinds of frequencies. After the devices 10 and 20, respectively, all the amplitude noise has disappeared and the frequency noise is restricted to the pass region of the devices 10 and 20, respectively. The width of this pass region is determined by the signal MS. This was (written somewhat differently from colum 1).

$$MS = A + a \sin \frac{2\pi}{p}\left(V_a + \frac{dx}{dt}\right)t$$

So if it is ensured that $V_s$ is large with respect to the maximum $dx/dt$ (=actual speed), this is only a narrow band.

The frequency of RB and MB, respectively, is now doubled, on behalf of a given desired interpolation, a number of times in multiplication stages (three of them are shown) 11, 12 and 13 and 21, 22 and 23 respectively. This is done by known means: an astable multivibrator is impulsed by the leading edge of both RB and $\overline{RB}$ and MB and $\overline{MB}$, respectively, and decays again after ¼ period of RB and MB, respectively. As a result of this a block voltage with the double frequency 2RB and 2MB, respectively, is formed (in the stages 11 and 21, respectively). Of course, this block voltage also must be symmetrical, which is why the symmetry is safeguarded and recontrolled by means of control devices 14 and 21, respectively. The next two doubling stages 12, 13 and 22, 23, respectively, operate in the same manner in which the quality of the symmetry in the last stage is of so little importance that it can also be controlled by the control devices 15 and 25, respectively, of the second stages 12 and 22, respectively. Up to this point, the handling of RS and MS is identical and one has obtained 8RB, $\overline{8RB}$ and 8MB, $\overline{8MB}$. It will be obvious that these signals also are still subject to frequency noise with frequencies about the fundamental frequency RB and furthermore with the multiples of those frequencies as a result of the frequency multiplication.

Figure 1C:
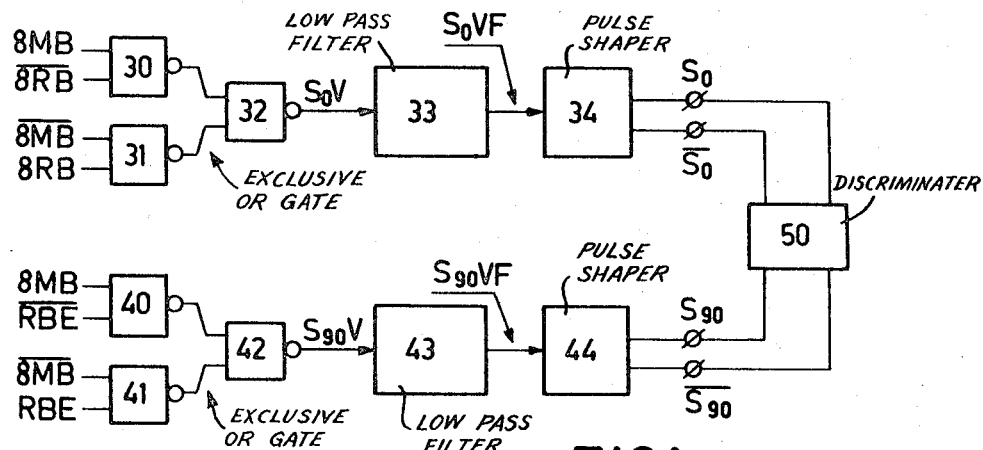
Figure 2:
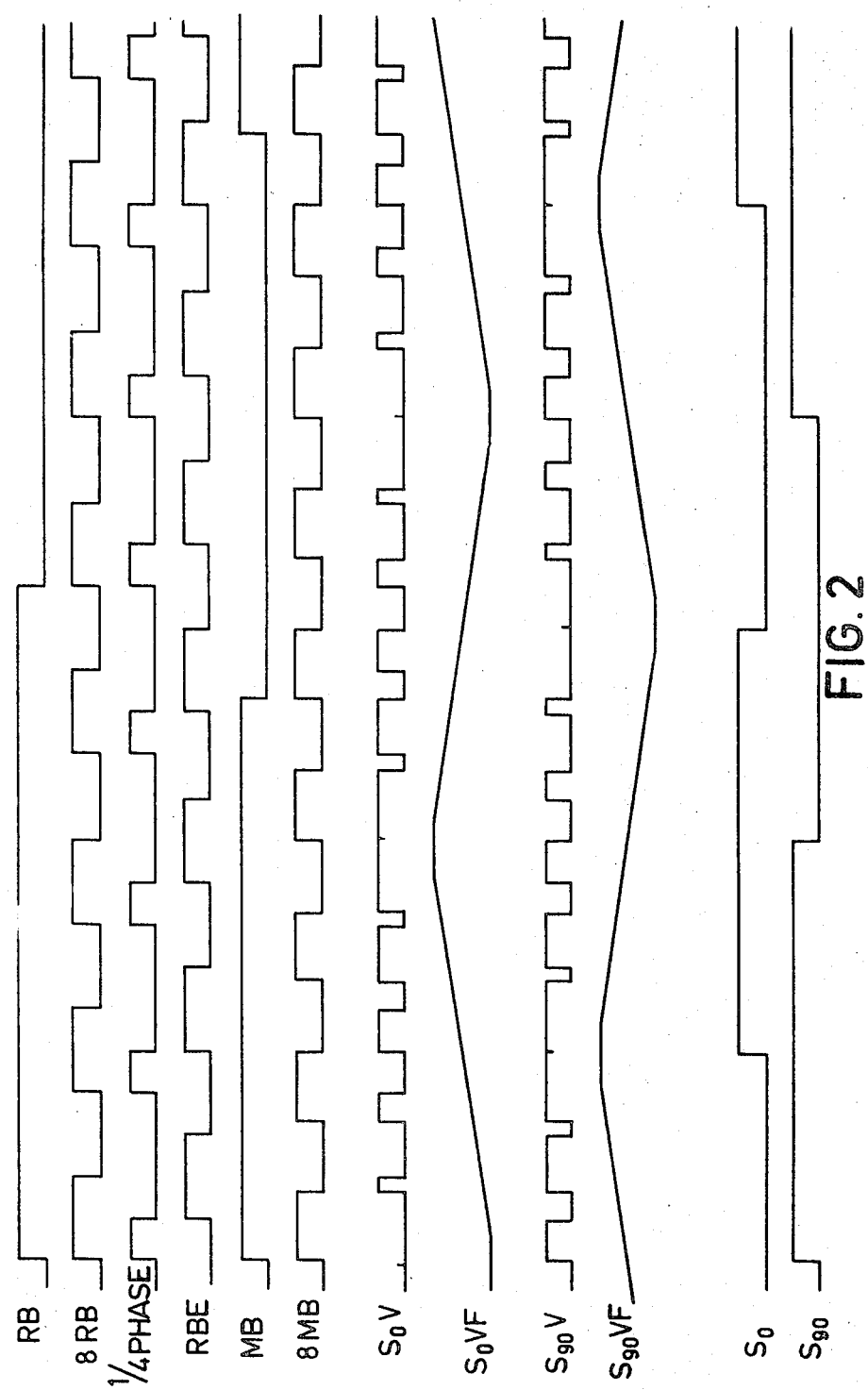
FIG. 2 shows the shapes of the signals occurring in the system.

According to the invention, the resulting signals 8RB, $\overline{8RB}$, and 8MB, $\overline{8MB}$, respectively, are presented to a first "exclusive OR" gate 30, 31, 32 (FIG. 1c). The exclusive OR gate produces an output equal to the absolute value of the difference between the input signals thereto. The output signal $S_0V$ hereof has the shape as shown in FIG. 2. In this FIG. 2 it is assumed that the signal MB had a higher frequency than RB. The resulting signal $S_0V$ is subsequently presented to a low pass filter 33.

As already assumed, the proportioning of the system is such that $V_s \gg dx/dt$, or frequency MS—frequency RS≪frequency RS. If the signal $S_0V$ is conveyed in the low pass filter 33, a signal $S_0VF$, the height of which is proportional to the phase difference between the signals 8RB and 8MB (see FIG. 2) is obtained at the output of this filter 33. At constant but different frequencies of the signals 8RB and 8MB, a signal $S_0VF$ is obtained which in principle is triangular and which, dependent upon the construction of the filter 33, may be flattened to a trapezium and the fundamental frequency of which is equal to the difference between the frequencies of 8RB and 8MB. Frequency noise in the signal 8MB and 8RB is manifested as amplitude noise of the same frequency in the signal $S_0VF$. By proportioning the system so that the highest useful frequency of the signal $S_0VF$ is lower than the frequency of RB, the cut-off frequency of the low-pass filter may be made to be below the lower limit of the bandfilter of the devices 10 and 20, respectively. The lowest noise frequency still present in the signals 8RB and 8MB is suppressed so that the system is insensitive to interference to an extremely high extent.

The signal $S_0VF$ is further applied to a pulse shaping network 34 which may be a Schmitt trigger with sufficient hysteresis so as not to react to the small ripples of the signal $S_0VF$. At the outputs of this Schmitt trigger, the signals $S_0$ and $\overline{S}_0$ (see also FIG. 2) appear. The signal 8RB is besides to the first "exclusive OR"-gate 30, 31, 32 also applied to a phase delaying network consisting of the elements 16 and 17. These elements again are two astable multivibrators, the former (16) of which is impulsed by a leading edge of the signal 8RB and remains high ¼ period (90° phase difference) of 8RB and the second of which (17) is impulsed when the astable multivibrator 16 decays and remains high during a ½ period of the signal 8RB. The signal RBE is formed as shown in FIG. 2. In this case also the required accuracy is so low that the decay times which, naturally, must vary with variations in the signal RB can be readjusted by the control device 15, without the actual symmetry or phase shift of RBE being measured. The signals 8MB, $\overline{8MB}$, RBE, $\overline{RBE}$ according to the invention are further applied to the inputs of a second exclusive OR-gate 40, 41, 42, the signal $S_{90}V$ appearing at the output which subsequently in a manner identical to that described above for obtaining the signals $S_0$ and $\overline{S}_0$ is processed to $S_{90}$ and $\overline{S}_{90}$ signals, while using a low pass filter 43 and a pulse shaping network 44. As a result of the phase difference of ¼ period between the signals 8RB and RBE, the signal $S_{90}VF$ reaches its peak after the filter 43 when the signals 8RB and 8MB still have a phase difference of ¼ period. The signals $S_0$ and $S_{90}$ traverse one period each time the signals 8RB and 8MB are shifted one period relative to each other. So the signals $S_0$ and $S_{90}$ also will be phase-shifted ¼ period, but then ¼ part of their own period, which period is the difference of the frequencies of the signals 8MB and 8RB. The frequency of the signals $S_0$ and $S_{90}$ consequently may well be zero. Since, however, the signals are derived from unambiguous signals 8MS, 8RS and so on, no errors occur which are summed for $S_0$–$S_{90}$ signals which originated directly from the pick-up device, as in the said $S_0$, $S_{90}$ measuring system. The resulting signals $S_0$, $\overline{S}_0$, $S_{90}$, $\overline{S}_{90}$ which are present at the respective outputs of the pulse shaping networks 34 and 44 are further handled in the discriminator device (50) already mentioned.

Figure 3:
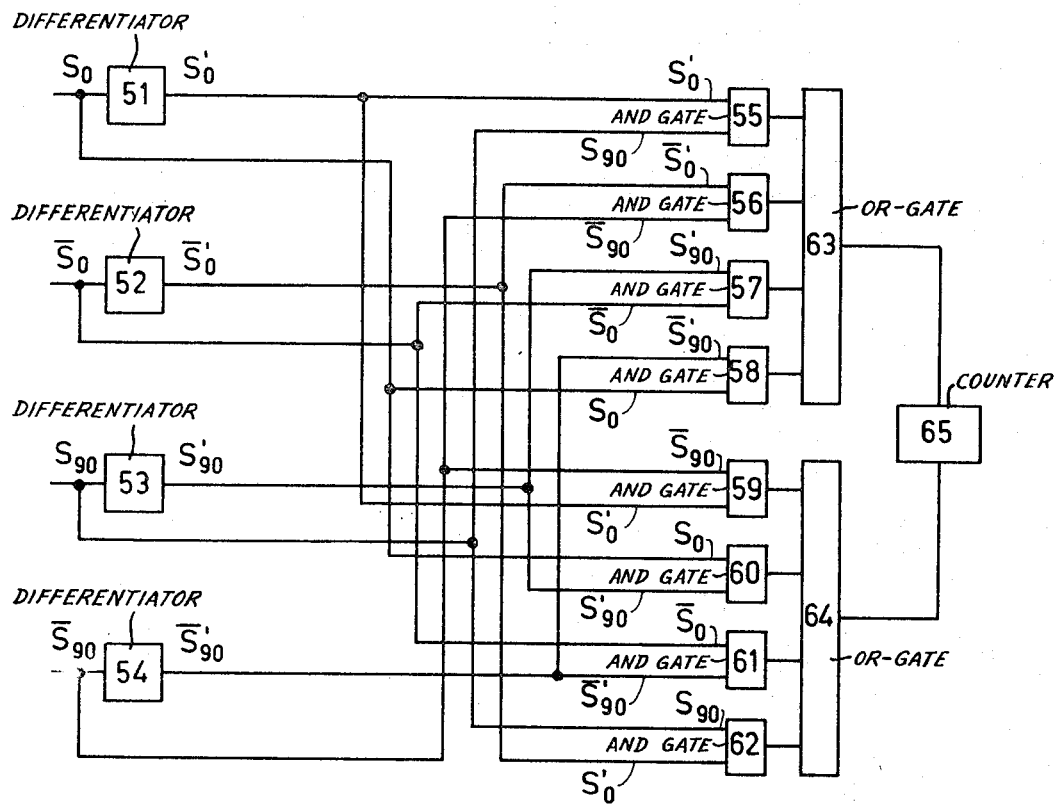
FIG. 3 shows the known discriminator device.

FIG. 3 shows the discriminator device 50. In this figure, reference numerals 51, 52, 53 and 54 denote differentiating stages, in which the differentiated series $S^1_0$, $\overline{S}^1_0$, $S^1_{90}$ and $\overline{S}^1_{90}$ are formed from the said signal series $S_0$, $\overline{S}_0$, $S_{90}$ and $\overline{S}_{90}$. In known manner the various series are applied to a series of two groups of four AND-gates 55, 56, 57 and 58 and 59, 60, 61 and 62, respectively. The output of each group is connected to an OR-gate 63 and 64, respectively. Dependent upon the sign (positive or negative) of the frequency difference between the signals RS and MS, a series of counting pulses appears at the output of one of the OR-gates 63 and 64, respectively, which pulses are applied to a counter 65 which counts forwards and backwards, respectively, under the control of the OR-gate 63 or 64 concerned.

This known discriminator device 50 supplies 4 counting pulses with the correct sign in each traversed period of $S_0$. A period of $S_0$ corresponded to a period difference between 8MB and 8RB as already denoted above and as shown in FIG. 2, or to ⅛ period difference of the signals MB, RB. Per period difference of the signals MB and RB, consequently 8×4 counting pulses with the correct sign are generated. So in this example, this gives a 32-fold interpolation in the frequency difference between the signals MS and RS. From this it follows that the highest frequency in the system is the frequency of the signal 8MB. This is in contrast with the said system in which the frequency of a required clock-pulse CL for the 32-fold interpolation discussed here, would have to have 32 times the frequency of the signal MB. So this differs by the factor 4 already mentioned (see column 2, item c) and the factor 6, respectively, as mentioned sub 2, column 2.

Of course the invention is not restricted to 32-fold interpolation but may in principle obtain any value. By omitting logic circuits, the discriminator device 50 may also supply two counting pulses or only one counting pulse coded in a given direction per period of the signal $S_0$. In addition the number of doubling stages may be varied or, if required, all the doubling stages may be omitted. The doubling stages, at the expense of loss of simplicity, may alternatively be replaced by a known frequency multiplying circuit which may be adjustable or not adjustable. Nor is the invention restricted to handling RS/MS-signals from displacement pick-up devices in machine tools, but may be used in all cases where varying quantities can be represented by the difference between the frequencies of two pulse series.

What is claimed is:

1. A device for converting a fixed frequency square wave pulse series and a variable frequency square wave pulse series into a first and second output square wave pulse series in phase quadrature and each of said output series having a frequency equal to the difference between the frequencies of the fixed and the variable frequency square wave pulses, and wherein the signs of the difference in phase between the first and second output pulse series depends on the sign of the difference in frequencies between the fixed and variable frequency pulses, comprising means for converting the fixed frequency series of pulses into a reference pulse series in phase quadrature with the fixed frequency pulse series, a first logic means for deriving a first pulse width modulated pulse series equal to the absolute value of the difference between the fixed frequency pulses and the variable frequency pulses and having a frequency component equal to the difference between the frequencies of the fixed and variable frequency pulse series, a second logic means for deriving a second pulse width modulated pulse series equal to the absolute value of the difference between the frequencies of the reference pulses and the variable frequency pulses and having the same frequency component as the first pulse width modulated pulse series and in phase quadrature with the first pulse width modulated pulse series, whereby the sign of the phase difference between the frequency components of the first and second pulse width modulated pulse series corresponds to the sign of the frequency difference between the fixed and variable frequency pulses, a separate low pass filter means connected to each of said logic means for extracting in substantially triangular form the frequency components from each of the pulse width modulated pulse series, and a separate wave shaping means connected to each filter means for converting the frequency components to said first and said second output square wave series having a frequency and phase difference corresponding to the frequency and phase difference of each of the pulse width modulated pulse series.

2. A device as claimed in claim 1 further comprising a separate means for inverting the fixed frequency, the variable frequency and the reference pulse series; and wherein the first logic means comprises a first exclusive OR-gate; means for connecting the fixed frequency, the variable frequency and the inverted fixed and variable frequency pulses to the first exclusive OR-gate; and wherein the second logic means comprises a second exclusive OR-gate; and means for connecting the variable frequency pulses, the reference pulses, the inverted variable frequency pulses and the inverted reference pulses to the second exclusive OR-gate.

3. A device as claimed in claim 2, further comprising a separate band pass filter means for the fixed and variable frequency pulse series, wherein the lower limit of the band pass regions of the band pass filters is higher than the cut-off frequency of the low pass filters, and further comprising coupling means for connecting the band pass filters to the logic means and to the inverting means.

4. A device as claimed in claim 3, wherein the coupling means comprises frequency multiplying means.

References Cited
UNITED STATES PATENTS

| | | | |
|---|---|---|---|
| 2,617,939 | 11/1952 | Nicolas | 324—79 X |
| 2,911,641 | 11/1959 | Kohler. | |
| 2,933,682 | 4/1960 | Moulton et al. | 324—82 X |
| 3,011,150 | 11/1961 | Ketchledge | 328—110 X |
| 3,078,415 | 2/1963 | Frelich | 324—85 X |
| 3,297,947 | 1/1967 | Riordan et al. | 324—83 |
| 3,354,398 | 11/1967 | Broadhead. | |

RUDOLPH V. ROLINEC, Primary Examiner

R. J. CORCORAN, Assistant Examiner

U.S. Cl. X.R.

307—232, 233; 324—79; 328—109